United States Patent
Shan et al.

(10) Patent No.: US 8,625,580 B2
(45) Date of Patent: Jan. 7, 2014

(54) VOICE OVER INTERNET PROTOCOL SESSION IDENTIFIERS FOR VOICE OVER INTERNET PROTOCOL CALLS

(75) Inventors: Chang Hong Shan, Shanghai (CN); Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 13/249,209

(22) Filed: Sep. 29, 2011

(65) Prior Publication Data

US 2013/0083792 A1    Apr. 4, 2013

(51) Int. Cl.
*H04L 12/66* (2006.01)
*H04W 4/00* (2009.01)

(52) U.S. Cl.
USPC .......................................... 370/352; 370/328

(58) Field of Classification Search
USPC ................................. 370/352, 328
See application file for complete search history.

(56) References Cited

U.S. PATENT DOCUMENTS

| | | |
|---|---|---|
| 7,756,509 B2 | 7/2010 | Rajagopalan et al. |
| 7,787,627 B2 | 8/2010 | Sood et al. |
| 2004/0153667 A1 * | 8/2004 | Kastelewicz et al. ......... 713/201 |
| 2010/0297979 A1 * | 11/2010 | Watfa et al. ................ 455/404.1 |
| 2011/0255465 A1 | 10/2011 | Shan et al. |

FOREIGN PATENT DOCUMENTS

WO    WO 2012055087 A1 *   5/2012

OTHER PUBLICATIONS

WiMax Forum Network Architecture, "WiMAX VoIP Service (WVS)", WiMAX Forum, PreDraft-T33-121-R020v01-a, Feb. 1, 2011, pp. i-87.*
WiMAX Forum Network Architecture, "WiMAX VoIP Service (WVS)", WiMAX Forum, WMF-T33-121-R020v01, Aug. 9, 2011, pp. 1-90.*
WiMAX Forum Network Architecture, "WiMAX VoIP Service (WVS)," WiMAX Forum Proprietary, PreDraft-T133-121-R020v01-A, Working Draft, Feb. 1, 2011, pp. i-87.

* cited by examiner

*Primary Examiner* — Nicholas Jensen
(74) *Attorney, Agent, or Firm* — Schwabe, Williamson & Wyatt, P.C.

(57) ABSTRACT

Embodiments of the present disclosure describe methods, apparatuses, and systems for voice session identifiers to facilitate voice over Internet protocol calls. Some embodiments include use of session identifiers that indicate an enabled status of individual call types for a mobile station. These session identifiers may be generated based on an authentication of a voice-services session.

15 Claims, 7 Drawing Sheets

VOICE OVER INTERNET PROTOCOL SESSION IDENTIFIERS FOR VOICE OVER INTERNET PROTOCOL CALLS

FIELD

Embodiments of the present disclosure generally relate to the field of wireless communication systems, and more particularly, to voice over Internet protocol session identifiers for voice over Internet protocol calls.

BACKGROUND

Voice over Internet protocol (VoIP) techniques and processes are used to provide voice calls over an IP network. VoIP utilization in broadband mobile access technologies is confronted by challenges faced by the network components establishing and managing voice calls that are differentiated on a call-type basis.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
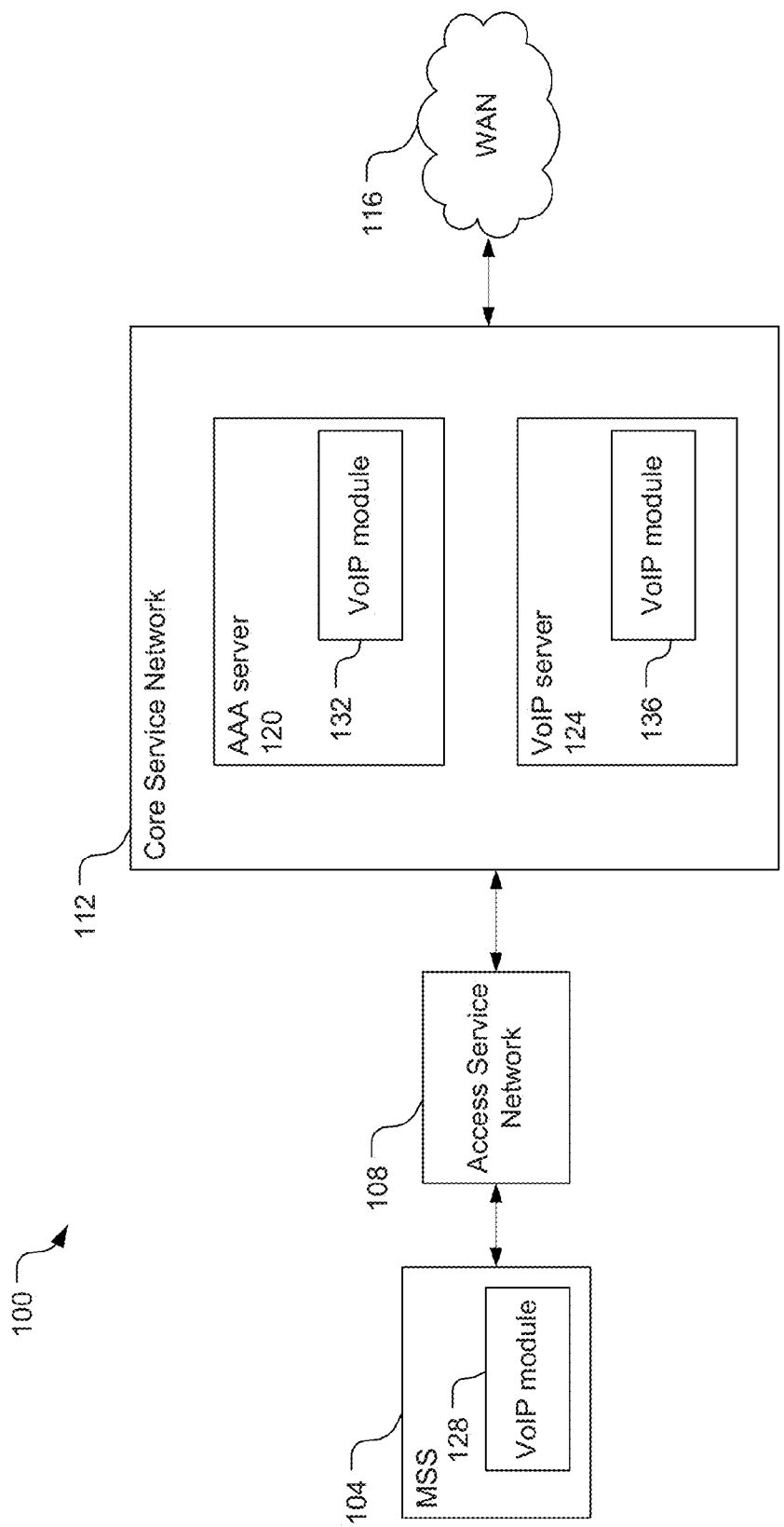
FIG. 1 schematically illustrates a networking environment in accordance with some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Embodiments of the present disclosure may be used in, and generally described with reference to, wireless communication networks that employ orthogonal frequency division multiple access (OFDMA) communications as used by multicarrier message schemes presented in the Institute of Electrical and Electronics Engineers (IEEE) 802.16—2009, approved May 13, 2009, along with any amendments, updates, and/or revisions. Products/processes compatible with and otherwise implementing aspects of IEEE 802.16—2009 may be referred to as WiMAX products/processes.

While embodiments are primarily described with reference to WiMAX products/processes, various embodiments may also be applied to products/processes related to 3rd Generation Partnership Project (3GPP) long-term evolution (LTE) project along with any amendments, updates, and/or revisions (e.g., advanced LTE project, ultra mobile broadband (UMB) project (also referred to as "3GPP2"), etc.) In other embodiments, communications may be compatible with additional/alternative communication standards, specifications, and/or protocols.

FIG. 1 schematically illustrates a networking environment 100 in accordance with some embodiments. The networking environment 100 may include a mobile subscriber station (MSS) 104, an access services network (ASN) 108; a core service network (CSN) 112; and a wide area network (WAN) 116 communicatively coupled with one another as shown by bidirectional arrows.

The ASN 108 may provide broadband wireless radio access to mobile subscriber stations, such as MSS 104. The ASN 108 may include one or more base stations (referred to as evolved nodeBs (eNBs) in LTE) and one or more gateways. The gateways may aggregate subscriber and control traffic from the base stations and communicate with the CSN 112.

The CSN 112 may provide various Internet protocol (IP) connectivity functions to interconnect the ASN 108 with the WAN 116, e.g., Internet. The CSN 112 may have an authentication component, e.g., an authentication, authorization, and accounting (AAA) server 120, to implement one or more AAA protocols related to provision of networking services to subscribers and/or devices. The AAA server 120 may be referred to as home AAA (H-AAA) server 120 to indicate that it is located in a home network of the MSS 104. The CSN 112 may also include a VoIP server 124 (referred to as WiMAX VoIP Service (WVS) server in WiMAX) that may control registration of subscribers and/or devices for VoIP services as well as various call initiation, maintenance and termination operations as discussed herein.

The MSS 104, the AAA server 120, and the VoIP server 124 may include VoIP modules 128, 132, and 136, respectively, to perform respective VoIP operations. The VoIP operations may include generation, distribution, and use of VoIP session identifiers as will be described herein.

Figure 2:
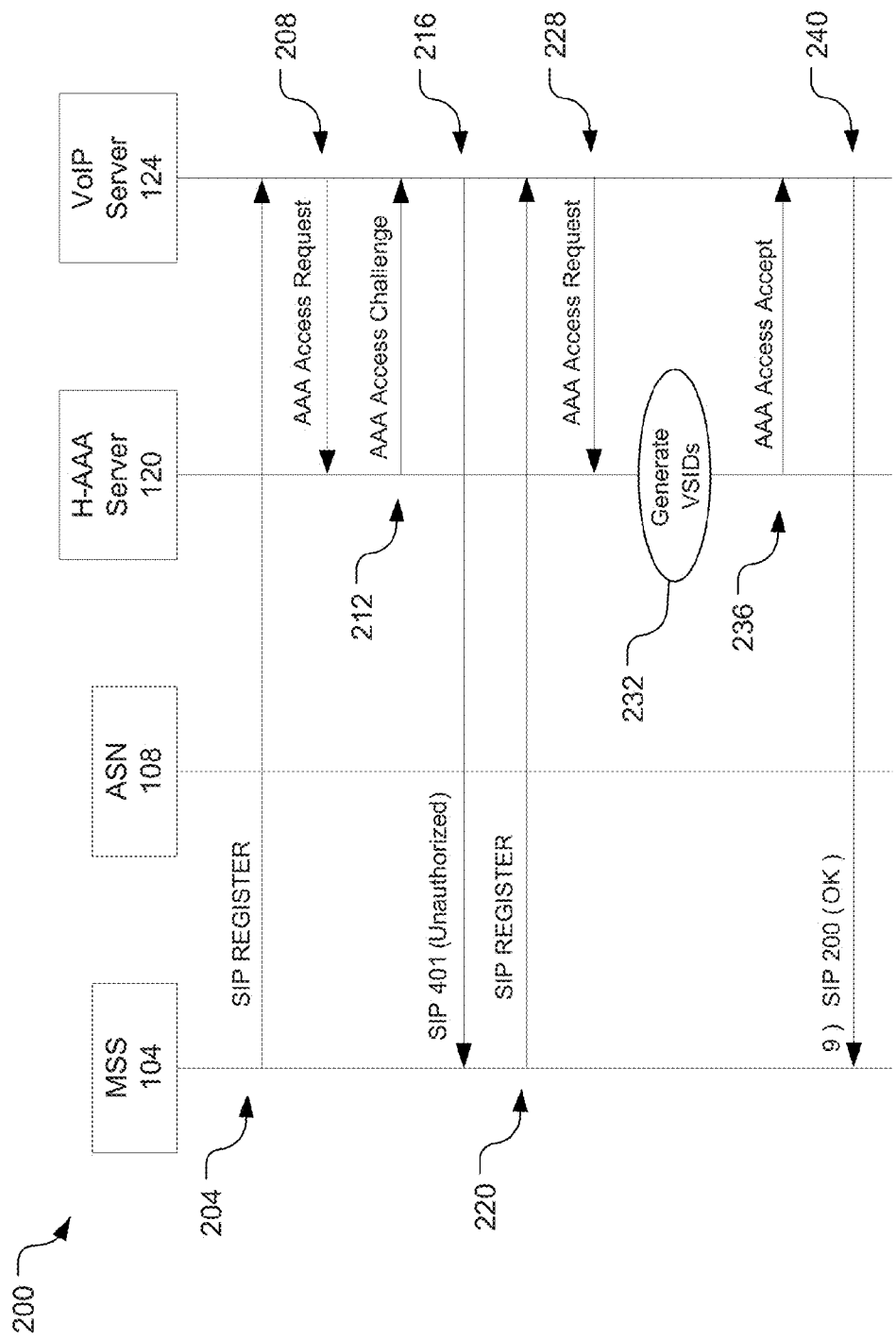
FIG. 2 is a call flow between components of a networking environment in accordance with some embodiments.

FIG. 2 is a call flow 200 between components of the networking environment 100 that illustrates the generation and distribution of VoIP session identifiers in accordance with various embodiments. The call flow 200 may implement at least some aspects of a session initiation protocol (SIP) to control a voice-services session.

The call flow 200 may begin after the MSS 104 has established IP connectivity with the CSN 112 and obtained an IP address of the VoIP server 124. At 204, the VoIP module 128 of the MS 104 may register with the VoIP module 136 of the VoIP server 124 by sending a SIP registration message, e.g., SIP REGISTER message to a VoIP module 136 of the VoIP server 124. The SIP REGISTER message may include a header having an expires-time value, but omitting authentication parameters for registering a voice-services session.

The expires-time value, which may be a non-zero time in seconds, is a time that the MSS 104 is providing for a registration of the voice-services session to remain active. If a voice-services session is not re-registered within that time, the voice-services session may be terminated.

Unless otherwise indicated, VoIP-related operations attributed to the MS 104, AAA server 120, and/or VoIP server 124 may be performed by VoIP modules 128, 132, and/or 136, respectively.

At 208, the VoIP server 124 may send an AAA Access Request message to the H-AAA Server 120, based on receipt of the SIP REGISTER message. The AAA Access Request message sent at 208 may be an initial authentication request of a voice-services session for the MSS 104.

When receiving the AAA Access Request message with the initial authentication request of the voice-services session, the H-AAA server 120 may check whether the MSS 104 exists as a mobile subscriber. If the MSS 104 exists as a mobile subscriber, the H-AAA Server 120 may generate a related voice-services security context for the MSS 104 and reply with an AAA Access Challenge message, at 212, that includes the voice-services security context. The voice-services security context may include authentication parameters that are to be used by the MSS 104 for registering a voice-services session.

At 216, the VoIP server may send a SIP unauthorized message, e.g., SIP 401 (Unauthorized) message, to the MSS 104. The SIP 401 (Unauthorized) message may provide the MSS 104 with security information, e.g., the voice-services security context, from the AAA Access Challenge message.

After receiving the SIP 401 (Unauthorized) message, the MSS 104 may, at 220, send a SIP REGISTER message to the VoIP server 124 to register a voice-services session. The SIP REGISTER message may include the voice-services security context and the expires-time value, i.e., the same values as carried in the SIP REGISTER message sent at 204.

Upon receiving the SIP REGISTER message, sent at 220, the VoIP server 124 may retrieve the authentication parameters from the voice-services security context within a header of the SIP REGISTER message. The VoIP server 124 may then send, at 228, an AAA Access Request message to the H-AAA server 120. The AAA Access Request message may include the authentication parameters and the expires-time value retrieved from the SIP REGISTER message sent at 220.

When receiving the AAA Access Request, sent at 228, the H-AAA server 120 may retrieve the authentication parameters and the expires-time value and attempt to authenticate the voice-services session for the MSS 104. If the authentication is successful, the H-AAA server 120 may, at 232, generate a number of VoIP session identifiers (VSIDs) according to a profile and credit associated with the MSS 104.

The VSIDs may indicate an enabled status (e.g., enabled or not enabled) for each of a number of different call types. For example, the VSIDs may indicate an enabled status, for the MSS 104, for an emergency call type, a free call out type, a free call in type, a non-free call out type, and/or a non-free call in type. In some embodiments, the VSIDs may indicate an enabled status for each of the different call types. For example, VSIDs may include a bit that corresponds to each of the different call types. The call types that correspond to set bits may be enabled for the MSS 104, while the call types that correspond to the non-set bits may be disabled for the MSS 104, or vice versa. In other embodiments, additional/alternative mechanisms of indicating enabled status for the different call types may be used.

The H-AAA server 120 may reply to the VoIP server 124 with an AAA Access Accept message at 236. The AAA Access Accept message may include an AAA security context generated by the H-AAA server 120 after receipt of the AAA Access Request message sent at 228. The AAA security context included in the AAA Access Accept message may include authentication parameters to be used by the MSS 104 to authenticate the H-AAA Server 120. Note that the authentication parameters within the AAA security context may be distinguished from the authentication parameters within the voice-services security context.

The H-AAA Server 120 may set a session timer, which establishes the amount of time a voice-services session registration is to remain active, according to the smaller one between the expires-time value and an allowed maximum voice session lifetime. Session timer information and VSIDs generated at 232 will also be included within the AAA Access Accept message sent at 236.

In some embodiments, the H-AAA Server 120 may generate and send a next-nonce value to the VoIP Server 124 in the AAA Access Accept message. This next-nonce value may be used by the MSS 104 to perform a re-registration with the VoIP server 124 at a later time.

When receiving the AAA Access Accept message, the VoIP Server 124 may reset the session timer for this voice-services session registration according to the session timer information received in AAA Access Accept message. The VoIP Server 124 may then, at 240, reply to the MSS 104 with a SIP authorization message, e.g., SIP 200 (OK) message. The SIP 200 (OK) message may include an authentication header having the AAA security context included in the AAA Accept message transmitted at 236. The SIP 200 (OK) message may further include the session timer information received by the VoIP server 124 in the AAA Access Accept message sent at 236. Upon receiving the SIP 200 (OK) message, the MSS 104 may authenticate the H-AAA Server 120 according to the authorization parameters in the AAA security context retrieved from an authentication header of the SIP 200 (OK) message. If the authentication succeeds, the MSS 104 may set its voice-session timer according to the session timer information received in the SIP 200 (OK) message; otherwise, the MSS 104 may try the registration procedure again. The MSS 104 will not initiate or accept a voice call via the VoIP Server 124 before successfully authenticating the authentication header.

Figure 3:
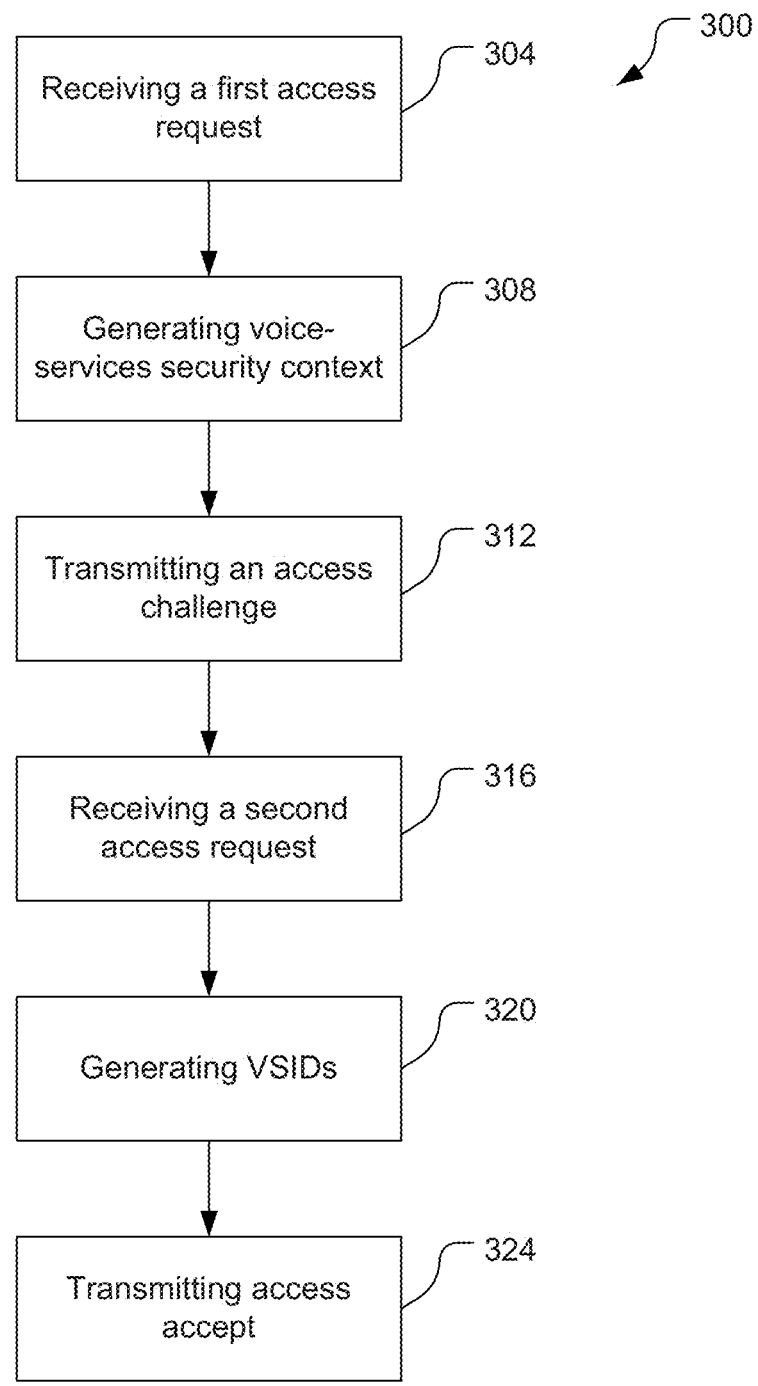
FIG. 3 illustrates a flowchart for a method of a voice over Internet protocol module in accordance with some embodiments.

FIG. 3 illustrates a flowchart for a method 300 of a VoIP module of an authentication component, e.g., VoIP module 132 of AAA server 120, generating and distributing VSIDs in accordance with an embodiment of the present disclosure. While various embodiments discuss the authentication component as the AAA server, in some embodiments the authentication component may be a policy and charging rules function (PCRF), a subscription profile repository (SPR), and/or a home location register/home subscriber server (HLR/HSS).

At block 304, the method 300 may include receiving a first access request. The first access request may be received from a VoIP server, e.g., VoIP server 124. The first access request may be an initial authentication request of a voice-services session for a MSS, e.g., MSS 104.

At block 308, the method 300 may include generating a voice-services security context. The voice-services security context may be generated based on a determination the MSS exists as a mobile subscriber within the network.

At block 312, the method 300 may include transmitting an access challenge. The access challenge may be transmitted to the VoIP server from which the access request was received. The access challenge may include the voice-services security context generated by the VoIP module of the H-AAA server.

At block 316, the method 300 may include receiving a second access request. The second access request may be received from the same VoIP server that transmitted the first access request. The second access request may include security information, provided by the MSS, and may include an expires-time value provided by the MSS.

At block 320, the method 300 may include generating VSIDs. The VSIDs may be generated upon an authentication of security information provided in the second access request.

At block 324, the method 300 may include transmitting an access accept message. The access accept message may be transmitted to the VoIP server and may include the generated VSIDs. The access accept message may also include a AAA security context generated based on receipt of second access request message at block 316.

Figure 4A:
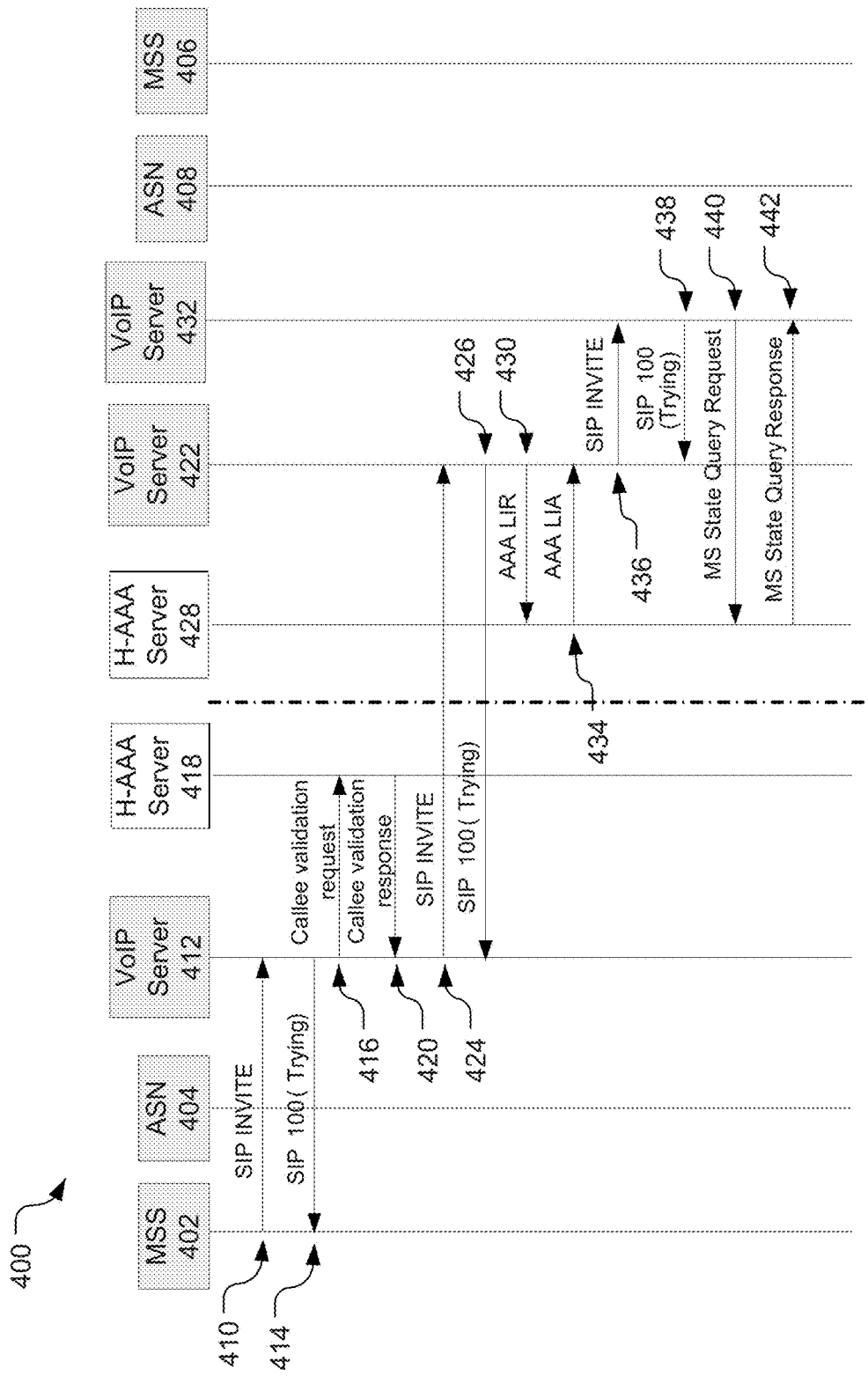
FIG. 4 is another call flow between components of a networking environment in accordance with some embodiments.

FIG. 4 is a call flow 400 between components of a networking environment that illustrates a call setup (which may also be referred to as "voice-services session establishment") using VoIP session identifiers in accordance with some embodiments. The call flow 400 may implement at least some aspects of a SIP to control a voice-services session. The call flow 400 may be designed to set up a call between MSS 402, served by ASN 404, and MSS 406, served by ASN 408. The network components described in FIG. 4 may be similar to, and substantially interchangeable with, like-named network components described in FIG. 1.

The call flow 400 may occur after a voice-services session has been registered (including generation and distribution of VSIDs) by a process similar to that described above. The call flow 400 may begin at 410 with the MSS 402 sending a SIP INVITE message to VoIP server 424 with which it has registered in order to set up a call with MSS 406.

The VoIP server 424 may determine a call type (e.g., emergency, free call out, or non-free call out) and may reference the VSID attributed to the MSS 402 for the call type. If the call type is enabled at the VoIP server 412, the VoIP server 412 may respond to the MSS 402 by transmitting a SIP 100 (Trying) message at 414 and continue with the call setup. If the call type is not enabled, the VoIP server 424 may terminate the call setup by responding with a SIP response message (not shown) with an appropriate error code.

In embodiments in which the MSS 402 is not registered to the VoIP server 412, the VoIP server 412 may attempt to discover the VoIP server with which the MSS 402 is registered in order to retrieve the VSIDs. In some embodiments, the SIP INVITE request may include an organizationally unique identifier (OUI) that includes an IP address of the VoIP server with which the MSS 402 is registered. Accordingly, the VoIP server 412 may access the OUI and attempt to resolve the IP address. The VoIP server 412 may then send a query to the VoIP server to retrieve the VSIDs, or at least the relevant VSID, associated with the MSS 402.

In the event that VoIP server 412 does not know the latest status of VSIDs, it may perform the call type check later in the setup process, e.g., at a callee validation request/response.

The call setup procedure may proceed, at 416, with the VoIP server 412 sending a callee validation request to an H-AAA server 418 of the mobile subscriber's home-network service provider (H-NSP) to validate whether the callee, i.e., the non-initiating party, is a subscriber of a legitimate target network whose operator has an interoperability agreement with the H-NSP. In the event the VoIP server 412 did not previously determine VSID(s) associated with the MSS 402, the VoIP server 412 may also use the callee validation request to request the IP address of the VoIP server with which the MSS 402 is registered and send a request for the VSID(s).

If the H-AAA Server 418 validates the callee successfully, it may, at 420, send a callee validation response message with a positive confirmation to the VoIP server 412. The callee validation response message may also include an IP address of the VoIP server with which the MSS 402 is registered if this information was requested in the callee validation request message. If the VoIP server 412 were to receive a callee validation response with a negative confirmation, the VoIP server 412 may abandon a call setup attempt and trigger a SIP BYE.

The H-AAA Server 418 may also return an IP address of a VoIP server, e.g., VoIP server 422, to which the VoIP server 412 shall forward the SIP INVITE message. The IP address of VoIP server 422 may be returned in the callee validation response message or separately therefrom.

After receiving the IP address of VoIP server 422, the VoIP server 412 may, at 424, send the SIP INVITE message 424 to the VoIP server 422.

At 426, VoIP server 444 may respond to the SIP INVITE message with a SIP 100 (Trying) message.

If the VoIP server 422 is not the VoIP server with which the callee is currently registered, it may contact an H-AAA server 428 in the same H-NSP by sending, at 430, an AAA Location Information Request (LIR) to get an IP address of a VoIP server with which the callee is currently registered, e.g., VoIP server 432.

The H-AAA server 428 may return the IP address of the VoIP server 432 in an AAA Location Information Answer (LIA) sent, at 434, to the VoIP server 422.

At 436, the VoIP server 422 may send a SIP INVITE message to the VoIP server 432. The VoIP server 432 may determine a call type of the call and reference VSIDs associated with MSS 406. If the call type is enabled for the MSS 406, the VoIP server 432 may send, at 438, a SIP 100 (Trying) message to the VoIP server 422. If the call type is not enabled for the MSS 406, the VoIP server 432 may send a SIP response message indicating an appropriate error code and terminate the call setup procedure.

In embodiments in which the VoIP server 432 does not know the latest status of VSIDs, it can wait to get that information until later in the process, and then it will take the checking action described in this step.

At 440, the VoIP server 432 may send a MS State Query Request message to H-AAA server 428 to retrieve a current state of MSS 406.

At 442, the H-AAA server 428 may respond to the VoIP server 432 with a MS State Query Response message that includes information about a current state of the MSS 406.

Figure 4B:
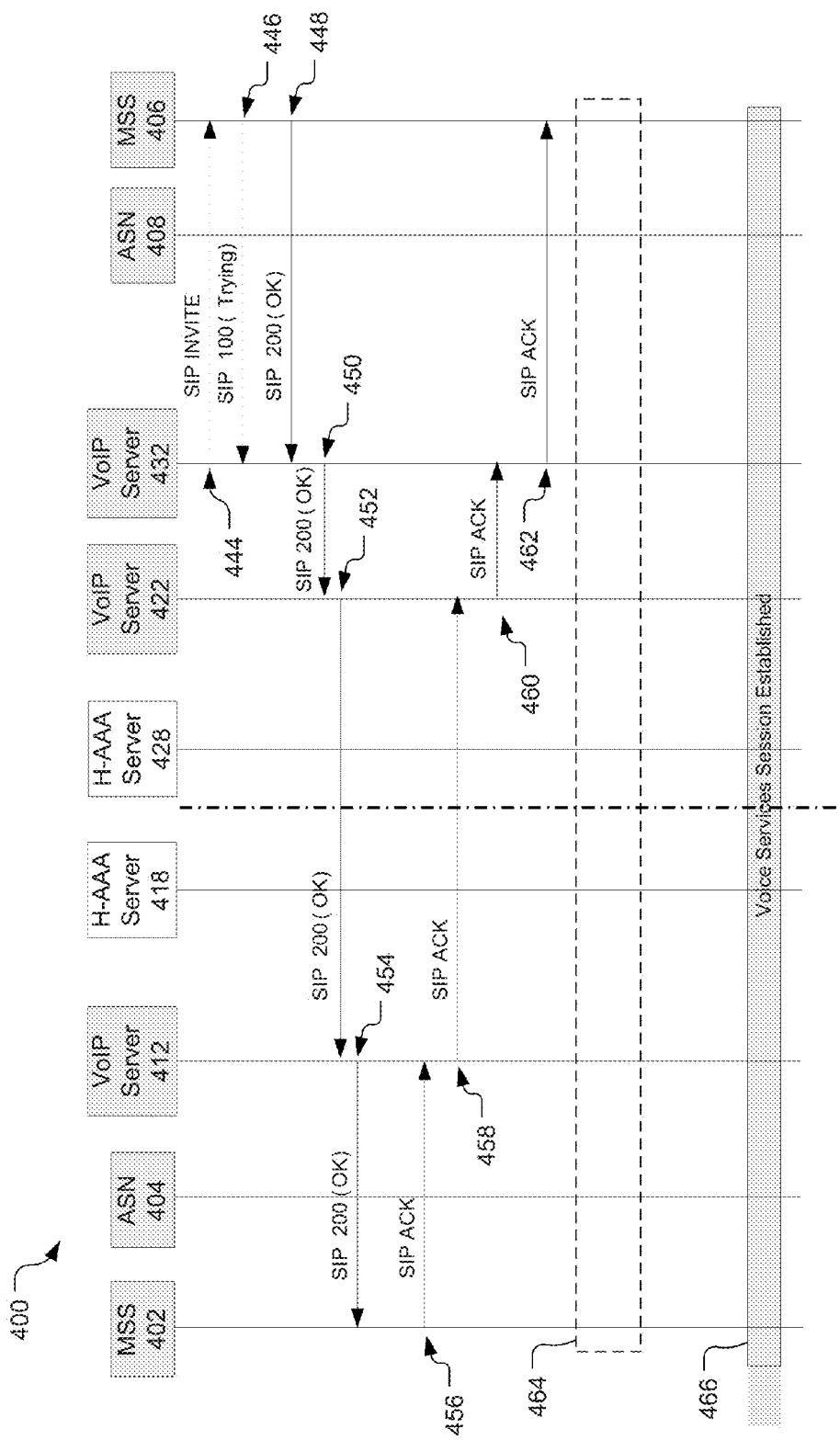

Referring now to FIG. 4b, the call flow 400 may continue with the VoIP server 432 forwarding, at 444, the SIP INVITE message, received from VoIP server 422, to the MSS 406.

In some embodiments, the forwarding of the SIP INVITE message at 444 may be performed simultaneously with sending the MS State query request at 440. Were the VoIP server 432 to determine that the MSS 406 is in a "Not In-Service" state and there is no replacement SIP user agent client (UAC) to which the VoIP server 432 may forward messages, a SIP response message indicating the corresponding status ((e.g., SIP 480 Temporarily Unavailable)) would be sent to the MSS 402.

At 446, the MSS 406 may respond to the SIP INVITE message with a SIP 100 (Trying) provisional response.

The media stream capabilities of the MSS 406 may be returned along the signaling path in a SIP 200 OK response, from MSS 406 to VoIP server 432 at 448, from the VoIP server 432 VoIP server 422 at 450, from the VoIP server 422 to the VoIP server 412 at 452, and from the VoIP server 412 to the MSS 402 at 454.

After receiving the SIP 200 (OK) message at 454, the MSS 402 may start the media flow for the voice session, and respond with a SIP ACK message sent to the VoIP server 412 at 456. The SIP ACK may be related to the MSS 406 by being transmitted from the VoIP server 412 to the VoIP server 422 at 458, from the VoIP server 422 to the VoIP server 432 at 460, and from the VoIP server 432 to the MSS 406 at 462.

In some embodiments, IP-connectivity access network (CAN) functions may be performed at 464 by various network components. For example, IP-CAN session modification and/or IP-CAN accounting may be performed to establish, maintain, or modify parameters of the voice-services session.

At 466, the voice-services session may be successfully established between the MSS 402 and MSS 406.

Figure 5:
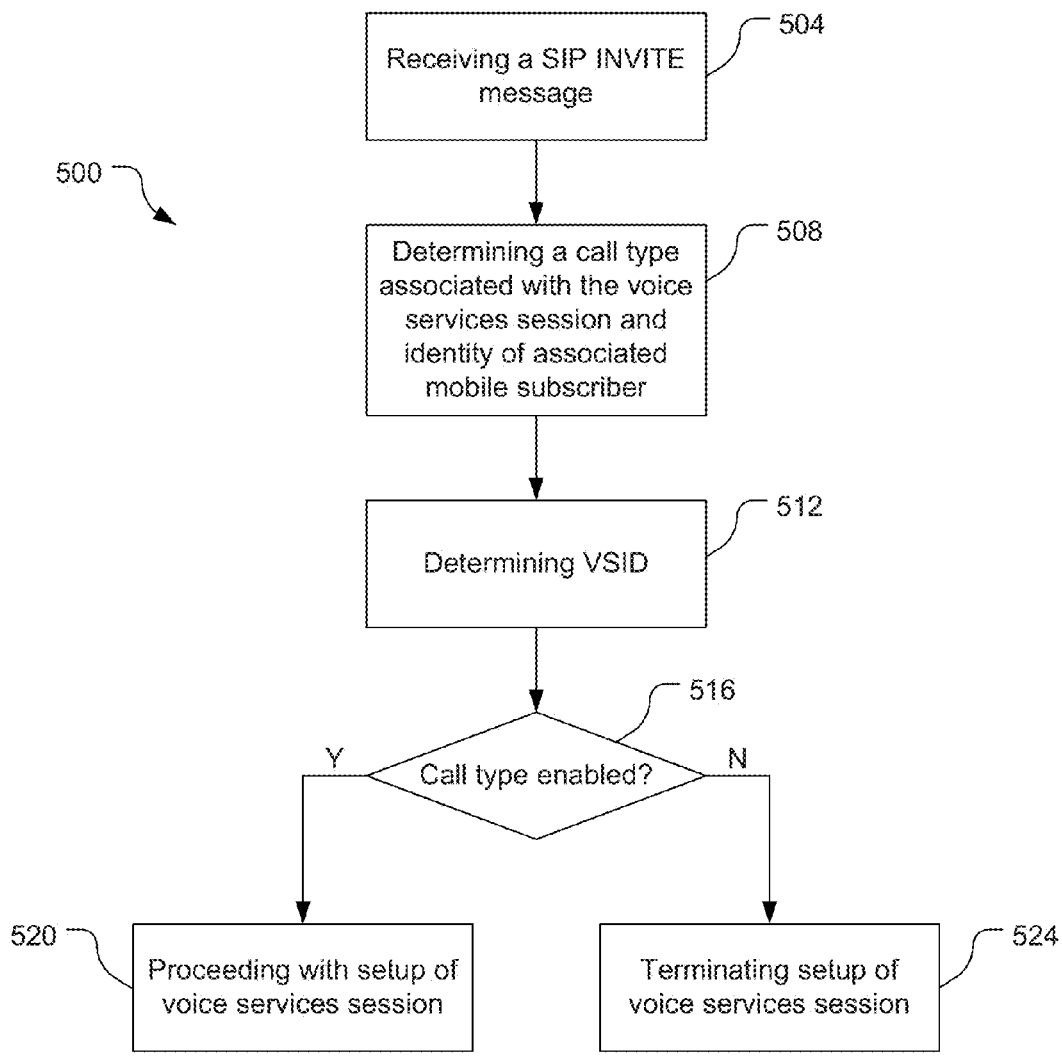
FIG. 5 illustrates a flowchart for another method of a voice over Internet protocol module in accordance with some embodiments.

FIG. 5 illustrates a flowchart 500 for a method of a VoIP module of a VoIP server, e.g., VoIP module 136 of VoIP server 124, setting up a call in accordance with some embodiments. In various embodiments the VoIP server may be a WVS server and/or a call session control function.

At block 504, the method 500 may include receiving a SIP INVITE message. In some embodiments, the SIP INVITE message may be received from an MSS attempting to establish a call, e.g., the MSS 402 sending the SIP INVITE message at 410 as illustrated in FIG. 4. In other embodiments, the SIP INVITE message may be received from another VoIP server, e.g., the VoIP server 422 sending the SIP INVITE message at 436 as illustrated in FIG. 4.

At block 508, the method 500 may include determining a call type associated with the voice-services session and an identity of an associated mobile subscriber. The call type and the identity of the associated mobile subscriber may be determined by examining parameters within the SIP INVITE message. The associated mobile subscriber may be the initiating party of the voice-services session, e.g., the caller, and/or the non-initiating party of the voice-services session, e.g., the callee.

In some embodiments, a VoIP module of a first VoIP server may perform the VSID check for the initiating party, while a VoIP module of a second VoIP server may perform the VSID check for the non-initiating party. In other embodiments, one VoIP module may perform the VSID checks for both the initiating party and the non-initiating party.

At block 512, the method 500 may include a determination of the VSID that is associated with the mobile subscriber for the given call type. The VSID may be stored locally or remotely with respect to the accessed VoIP server. In embodiments in which the VSID is stored remotely, e.g., on a VoIP server with which the mobile subscriber is registered, the accessed VoIP server may determine a network location of the VoIP server to which the MSS is registered and generate and send a request for the VSIDs in order to perform the determining of block 512.

At block 516, the method 500 may include a determination as to whether the call type is enabled.

If it is determined, at block 516, that the call type is enabled, the method 500 may advance to block 520 with the proceeding of the setup of the voice-services session. In some embodiments this may include sending call a validation request messages, SIP INVITE messages, and/or MS state query request messages such as shown in various stages of the call flow 400.

If it is determined, at block 516, that the call type is not enabled, the method 500 may advance to block 520 with the terminating of the setup of the voice-services session. In some embodiments this may include sending a SIP response message with an appropriate error code.

Figure 6:
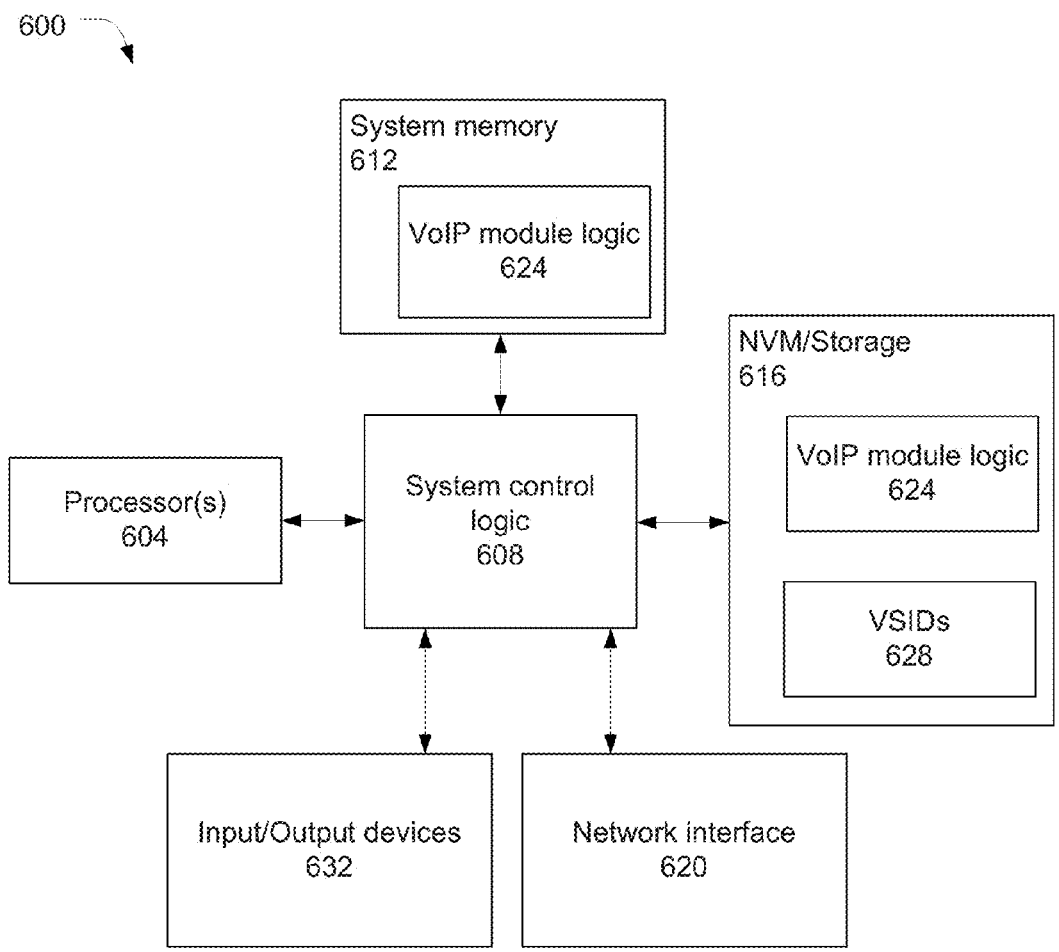
FIG. 6 illustrates an example system capable of implementing a voice over Internet protocol module in accordance with some embodiments.

The VoIP modules described herein may be implemented into a system using any suitable hardware and/or software to configure as desired. FIG. 6 illustrates, for one embodiment, an example system 600 comprising one or more processor(s) 604, system control logic 608 coupled to at least one of the processor(s) 604, system memory 612 coupled to system control logic 608, non-volatile memory (NVM)/storage 616 coupled to system control logic 608, and a network interface 620 coupled to system control logic 608.

The one or more processor(s) 604 may include one or more single-core or multi-core processors. The one or more processor(s) 604 may include any combination of general-purpose processors and dedicated processors (e.g., graphics processors, application processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

System control logic 608 for one embodiment may include one or more input/output (I/O) controller(s) to provide an interface to NVM/storage 616 and network interface 620.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s) for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

System memory 612 and NVM/storage 616 may include, in particular, temporal and persistent copies of VoIP module logic 624, respectively. The VoIP module logic 624 may include instructions that when executed by at least one of the processor(s) 604 result in the system 600 performing VoIP operations described herein. In some embodiments, the VoIP module logic 624 may additionally/alternatively be located in the system control logic 608. The NVM/storage 616 may also store various VSIDs 628 that may be used by VoIP modules in the registration and activation of voice-services sessions.

Network interface 620 may provide an interface for system 600 to communicate over one or more network(s) and/or with any other suitable device. Network interface 620 may include any suitable hardware and/or firmware. Network interface 620 for one embodiment may include, for example, a network adapter, a wireless network adapter, a telephone modem, and/or a wireless modem. For wireless communications, network interface 620 for one embodiment may use one or more antenna.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

The system 600 may further include input/output devices 632. The I/O devices 632 may include user interfaces designed to enable user interaction with the system 600, peripheral component interfaces designed to enable peripheral component interaction with the system 600, and/or sensors designed to determine environmental conditions and/or location information related to the system 600. In various embodiments, the user interfaces could include, but are not limited to, a display, e.g., a liquid crystal display, a touch screen display, etc., a speaker, a microphone, a still camera, a video camera, a flashlight (e.g., a light emitting diode flash), and a keyboard. In various embodiments, the peripheral component interfaces may include, but are not limited to, a non-volatile memory port, an audio jack, and a power supply interface. In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

In various embodiments, the system 600 may be a mobile computing device such as, but not limited to, a laptop computing device, a tablet computing device, a netbook, a smartphone, etc. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A server comprising:
a network interface configured to communicatively couple the server with a network; and
voice over Internet protocol (VoIP) circuitry coupled with the network interface and configured to:
receive an access request from a VoIP server via the network interface, the access request including an expires-time value and a security context;
authenticate, based on the security context, a voice-services session for a mobile subscriber that is provided broadband wireless radio access through an access services network; and
generate a plurality of session identifiers based on an authentication of the voice-services session, wherein individual session identifiers indicate an enabled status of individual call types for the mobile subscriber station and the plurality of session identifiers include a bit that corresponds to each of a plurality of call types that include an emergency call type, a free call out type, a free call in type, a non-free call out type, and a non-free call in type.

2. The server of claim 1, wherein the VoIP circuitry is further configured to:
access a subscriber profile associated with the mobile subscriber station; and
generate the plurality of session identifiers based on the subscriber profile.

3. The server of claim 1, wherein the VoIP circuitry is further configured to:
generate an access accept message that includes the plurality of session identifiers; and
transmit the access accept message to the VoIP server via the network interface.

4. The server of claim 1, wherein the access request is a first access request and the VoIP circuitry is further configured to:
receive, prior to receipt of the first access request, a second access request from the VoIP server;
generate the security context based on the second access request; and
transmit, to the VoIP server, the security context in an access challenge message.

5. The server of claim 1, wherein the server comprises an authentication, authorization, and accounting server.

6. A server comprising:
a network interface configured to communicatively couple the server to a network; and
voice over Internet protocol (VoIP) circuitry configured to:
receive, from a mobile subscriber station that is provided broadband wireless radio access through an access services network, a session initiation protocol (SIP) registration message, the SIP registration message to include authentication parameters to register a voice-services session;
transmit an access request message to an authentication component, based on the SIP registration message, the access request message to include the authentication parameters; and
receive an access accept message from the authentication component, the access accept message to include a plurality of session identifiers associated with the mobile subscriber station, wherein the plurality of session identifiers indicate an enabled status of individual call types for the mobile subscriber station and the plurality of session identifiers include a bit that corresponds to each of a plurality of call types that include an emergency call type, a free call out type, a free call in type, a non-free call out type, and a non-free call in type.

7. The server of claim 6, wherein the SIP registration message is a first SIP registration message and the VoIP circuitry is further configured to:

receive, from the mobile subscriber station prior to receipt of the first SIP registration message, a second SIP registration message, the second SIP registration message to omit authentication parameters for registering a voice-services session;

determine the authentication parameters; and transmit the authentication parameters to the mobile subscriber station in a SIP unauthorized message.

8. The server of claim 7, wherein the VoIP circuitry is to determine the authentication parameters by being configured to:

transmit, to the authentication component based on the second SIP registration message, an access request;

receive, from the authentication component, an access challenge that includes the authentication parameters.

9. The server of claim 7, wherein the authentication parameters are included in a voice-services security context transmitted in the first SIP registration message.

10. The server of claim 6, wherein the VoIP circuitry is further configured to:

receive, from the mobile subscriber station, a SIP invitation message to request initiation of a voice-services session;

determine a call type associated with the voice-services session;

determine an enabled status of the call type based on the plurality of session identifiers; and proceed with setup of the voice-services session based on the determined enabled status.

11. The server of claim 6, wherein the server comprises a WiMAX VoIP server.

12. A method comprising:

authenticating a voice-services session for a mobile subscriber that is provided broadband wireless access through an access services network;

receiving, by a voice over Internet protocol (VoIP) circuitry, a session initiation protocol (SIP) invitation message that requests initiation of the voice-services session;

determining, by the VoIP circuitry, a call type associated with the SIP invitation message;

determining, by the VoIP circuitry, a voice session identifier associated with the call type and a mobile subscriber station; and proceeding with, or terminating, setup of the voice-services session based on the determined voice session identifier, wherein the voice session identifier is one of plurality of session identifiers that include a bit that corresponds to each of a plurality of call types that include an emergency call type, a free call out type, a free call in type, a non-free call out type, and a non-free call in type.

13. The method of claim 12, wherein said determining the voice session identifier comprises:

determining an address of a VoIP server with which the mobile subscriber station is registered; and transmitting a request for the voice session identifier to the VoIP server.

14. The method of claim 12, wherein said receiving the SIP invitation message comprises:

receiving the SIP invitation message from the mobile subscriber station, wherein the mobile subscriber station is a party initiating the voice-services session.

15. The method of claim 12, wherein said receiving the SIP invitation message comprises:

receiving the SIP invitation message from a VoIP server, wherein another mobile subscriber station is a party initiating the voice-services session.

* * * * *